(12) United States Patent
Haimoff et al.

(10) Patent No.: US 8,961,058 B2
(45) Date of Patent: Feb. 24, 2015

(54) CORNER COUPLING

(75) Inventors: Efraim Haimoff, Mevaseret Zion (IL); Dor Carmon, Herzliya (IL)

(73) Assignee: Keter Plastic Ltd., Herzelyia (IL)

(*) Notice: Subject to any disclaimer, the term of this patent is extended or adjusted under 35 U.S.C. 154(b) by 164 days.

(21) Appl. No.: 13/389,673

(22) PCT Filed: Jul. 29, 2010

(86) PCT No.: PCT/IL2010/000611
§ 371 (c)(1),
(2), (4) Date: Jun. 7, 2012

(87) PCT Pub. No.: WO2011/018783
PCT Pub. Date: Feb. 17, 2011

(65) Prior Publication Data
US 2012/0269571 A1    Oct. 25, 2012

Related U.S. Application Data

(60) Provisional application No. 61/232,865, filed on Aug. 11, 2009.

(51) Int. Cl.
*F16B 12/46* (2006.01)
*F16B 12/48* (2006.01)

(52) U.S. Cl.
CPC ............... *F16B 12/46* (2013.01); *F16B 12/48* (2013.01)
USPC ........................................................ 403/170

(58) Field of Classification Search
USPC .......... 403/170–172, 176, 205, 217, 218, 231
See application file for complete search history.

(56) References Cited

U.S. PATENT DOCUMENTS

| | | | |
|---|---|---|---|
| 3,583,733 A | 6/1971 | Anderson | |
| 5,174,200 A | 12/1992 | Jeandel et al. | |
| 6,315,132 B1 * | 11/2001 | Hartel et al. | 211/26 |
| 6,471,434 B2 * | 10/2002 | Chin et al. | 403/175 |
| 6,561,603 B2 | 5/2003 | Knab et al. | |
| 6,902,068 B1 | 6/2005 | Fontana et al. | |

FOREIGN PATENT DOCUMENTS

| | | |
|---|---|---|
| EP | 0 451 012 A1 | 10/1991 |
| FR | 757.856 | 1/1934 |
| FR | 2546953 A1 * | 12/1984 |

OTHER PUBLICATIONS

The International Search Report for International Application No. PCT/IL2010/000611, mailed Mar. 30, 2011, two pages.

* cited by examiner

*Primary Examiner* — Michael P Ferguson
*Assistant Examiner* — Daniel Wiley
(74) *Attorney, Agent, or Firm* — Vorys, Sater, Seymour and Pease LLP; Susanne M. Hopkins; William L. Klima

(57) ABSTRACT

A corner coupling for attaching one or more beams to a support post, the coupling comprises one or more central coupling unit attached or integral with the support post, and one or more beam end couplers each extending at an end of the beam and being detachably attachable to a respective central coupling unit; wherein a each beam end coupler is configured for arresting engagement with an arresting arrangement of a respective central coupling unit composed of at least a wedge-type engagement, surface-to-surface load bearing and one or more auxiliary locking arrangement.

13 Claims, 19 Drawing Sheets

CORNER COUPLING

This is a National Phase Application filed under 35 U.S.C. §371 as a national stage of PCT/IL2010/000611, filed on Jul. 29, 2010, an application claiming the benefit under 35 U.S.C. §119(e) of U.S. Provisional Application No. 61/232,865, filed on Aug. 11, 2009, the content of each of which is hereby incorporated by reference in their entirety.

FIELD OF THE INVENTION

The subject matter relates to couplings designed to assemble various pieces of furniture and the like. In particular the disclosed subject matter is directed to a coupling arrangement for connecting one or more beams to a central support post.

BACKGROUND OF THE INVENTION AND PRIOR ART

Corner couplings are commonly used for the assembly of construction structures and furniture.

A wide variety of corner couplings are known in the art, for modular or fixed assembly, some of which offer coupling of one or more beams to a post at a single tier or at multi-tier configurations, some are restricted to coupling of beams at only an L-like or T-like configuration and others facilitate coupling of beams also at X-like configurations, some require the use of hand tools for assembly and disassembly, etc.

One sort of coupling is discussed in U.S. Pat. No. 6,902,068 directed to a supporting frame for a cabinet of an electrical panel has a first structural element and a second structural element with contoured bodies and which are mutually connectable. One of the structural elements includes engagement means for connecting the elements.

U.S. Pat. No. 6,561,603 discloses a basic rack, particularly for equipment cabinets, transverse profiles and depth profiles are connected by corner connectors to an upper and lower frame. Vertical profiles connect the upper and lower frame in the area of the corner connectors. At least the transverse and depth profiles are made from a triangular, particularly rectangular hollow profile. The corner connectors are provided with two complimentary constructed triangular fixing extensions for mounting the transverse and depth profiles. The vertical profiles have terminal end fastening inserts for fastening to the corner parts of the corner connectors.

SUMMARY OF THE INVENTION

The coupling subject of the present disclosed matter provides a 3-D attachment for attaching one or more beams to a support post. The coupling is comprised of one or more central coupling unit (CCU) attached or integral with the support post and one or more beam end couplers (BECs) each extend at an end of the beam and being detachably attachable to a respective central coupling unit.

According to one particular configuration, the one or more beams are coupled to the support post at substantially right angles, this however being a particular, non-limiting configuration.

The coupling assembly according to the disclosed subject matter facilitates attachment of horizontally oriented beams to a vertically oriented post, where the terms horizontal and vertical suggest that the assembled structure is placed on a level surface.

According to the disclosed subject matter each beam end coupler (BEC) is configured for arresting engagement with an arresting arrangement of a respective central coupling unit (CCU) composed of at least a wedge-type engagement, surface-to-surface load bearing and one or more auxiliary locking arrangement.

The CCU is formed with a tapering arresting rail extending substantially parallel to the support post, and a support slot extending below a top edge of the arresting rail and substantially perpendicular thereto. The BEC is fitted with a tapering locking tab suited for wedging arresting by the arresting rail, and a support tab suited for arresting within the support slot.

Further support and arresting means may be provided such as one or more auxiliary locking receptacles formed CCU and corresponding one or more auxiliary projecting tabs for arrestment within said one or more locking receptacles. In addition, one or more locks may be provided for securing the assembled structure and to prevent its unintended disassembly.

Where the CCU is fitted at a top end of the support beam, the BEC may further comprise a cover segment for concealment of the top of the support beam, and optionally it may be fitted with an auxiliary locking tab projecting into an auxiliary locking receptacle formed at the center of the support rod. Where several beams are coupled to the support post thus each BEC is fitted with a complimentary portion of a post cover, together covering the top end of the support beam.

According to one particular design, the BEC is secured to the CCU by a locking tab projecting into a respective locking aperture of the BCE and fixed by a lateral fastener engaging the locking tab within the locking aperture. Two neighbouring beams may be locked to the support post by provision of a common locking aperture with two respective locking tabs of the neighbouring BCEs complimenting one another to complete the shape of the locking aperture, with a locking pin laterally fixing and arresting the two BCEs.

The CCU may be fitted at any location along the support post, namely at or adjacent a top end thereof, and/or along its length. Furthermore, a CCU may be provided on each face of the support post (e.g. one to three CCUs or a support post having a triangular section; one to four CCUs or a support post having a rectangle section, etc.). The CCUs may be equi-angularly distributed about the support post, or at irregular angles. Where the support post and/or respective beam do not have a polygonal cross-section suitable CCU and/or BCE respectively are fitted thereto so as to mimic a polygonal section.

The one or more CCUs and BECs may be integrally manufactured with the support post and beam, or over-moulded over a section of the support post and respectively at an end of a beam, or supplied separately such that it can be fitted over the respective parts being attached.

A coupling arrangement of the disclosed subject matter provided a rigid coupling engagement easily assembled/disassembled, requiring substantially little or no force at all and no special tools. The coupling is suited for bearing loads in all directions but one, namely an upwardly directed force acting on the beam, which in fact acts to separate and disassemble the coupler assembly.

The disclosed subject matter is further concerned with furniture articles and structures comprising a coupler as disclosed herein.

BRIEF DESCRIPTION OF THE DRAWINGS

In order to understand the disclosed subject matter and to see how it can be carried out in practice, embodiments will now be described, by way of non-limiting examples only, with reference to the accompanying drawings, in which:

FIGS. 9A to 9D illustrate a modification of the corner coupler subject of the present disclosure, wherein the beams extend inclined with respect to one another and with respect to the support post, wherein:

FIG. 9A is a perspective view of the assembled corner coupling;

FIG. 9B is a schematic top representation of the coupler illustrated in FIG. 9A;

FIG. 9C is a schematic front representation of the coupler illustrated in FIG. 9A; and FIG. 9D is a schematic right side representation of the coupler illustrated in FIG. 9A.

DETAILED DESCRIPTION OF SPECIFIC EMBODIMENTS

Figure 1:
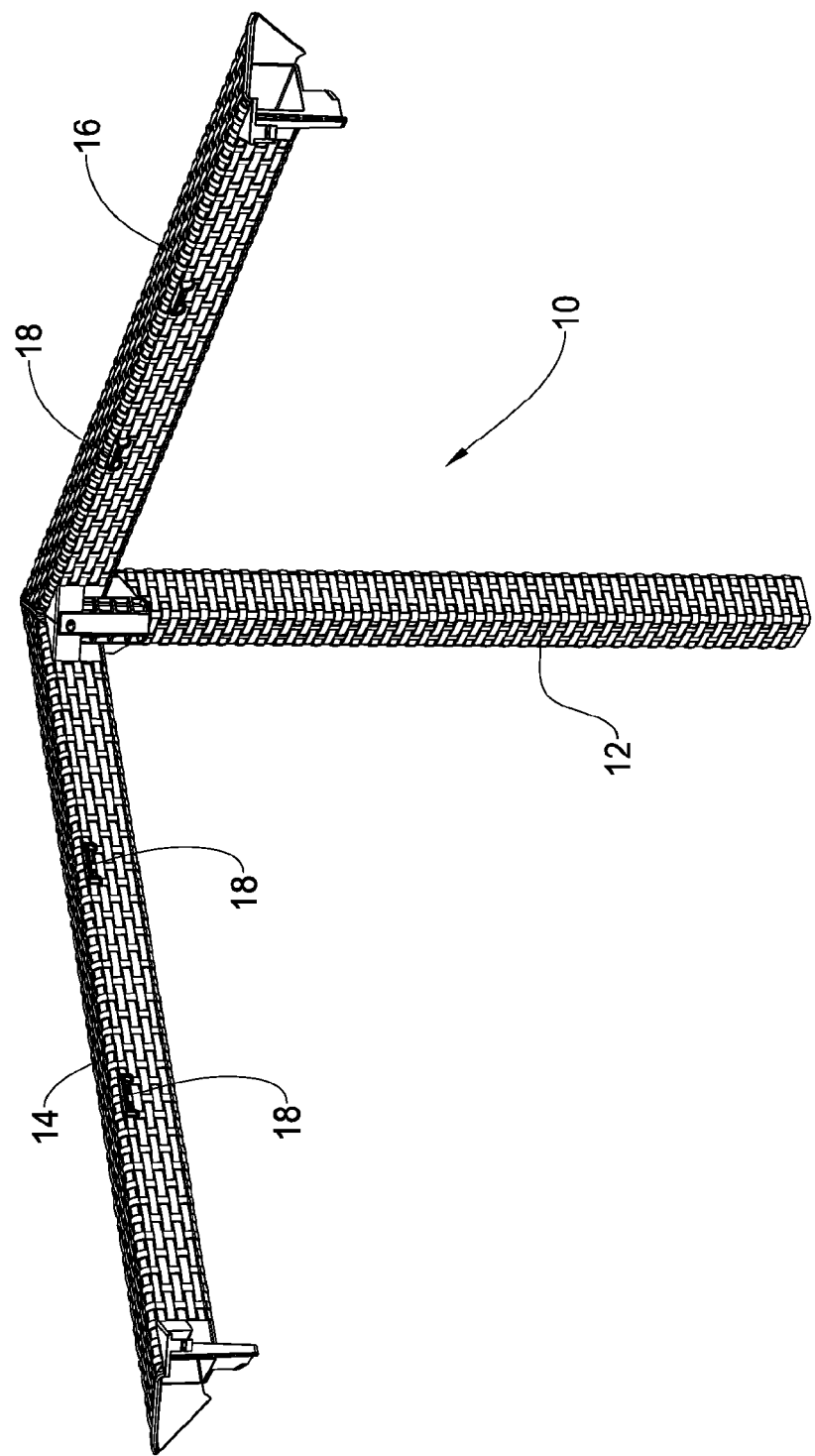
FIG. 1 is a perspective isometric view of a corner of a furniture item, fitted with a corner coupling according to the subject matter disclosed.

Attention is first directed to FIG. 1 of the drawings illustrating a furniture item corner generally designated 10 in the present example being a corner of a coffee table and the like. The corner assembly designated 10 illustrates a support post 12 extending substantially upright (i.e. vertical from a substantially flat support plane, not shown) with two beams 14 and 16 extending at right angles thereto, thus forming a corner suited for supporting a top such as a glass top and the like (not shown) by means of laterally projecting support tabs 18.

In the present example, the support post 12 and beams 14 and 16 are imparted with a rattan-look wherein the post 12 and beams 14 and 16 may either be construction elements coated with a rattan layer or a moulded constructional element. It is also appreciated that the support post and beams may be configured with any cross-section, i.e. regular or non-regular polygonal cross-section, or even circular/oval cross-section, wherein an appropriate adapting segment is required for attaching respective central coupling unit (CCU) and beam end coupler (BEC) as described hereinafter.

With further reference being made now also to FIGS. 2A to 2I directed to a corner coupling assembly 10 of the type used in the furniture item of FIG. 1. The corner coupling is composed of a central coupling unit (CCU) 20 fixedly secured at a top end of the support post 12, and a beam end coupler (BEC) 22 fitted at the end of each of the beams 14 and 16.

In the particular example, the CCU is composed of two CCUs fitted at neighbouring faces of the support post 12, each for securely attaching to a respective BEC. Each of the CCUs is formed with a support slot 24 substantially vertically extending, however tapering downwards from an opening 26 at a top end thereof, and an arresting rail 28 extending at a lower end of the CCU and extending substantially horizontal. On the other hand, each of the beam end couplers 22 comprises a tapering locking tab 34 extending substantially vertically and adapted for wedge-engagement within the corresponding tapering arresting rail 24, with a substantially extending horizontal support tab 38 configured for arrestment within the support slot 28.

The arrangement being such that each of the beams 14 and 16 is coupled to the support post 12 by displacing it in a substantially downward direction into the engaged position, upon which each of the bars becomes arrested in all respective directions, however being removable only in a reverse direction, namely upon applying an upwardly directed force.

Figure 2A:
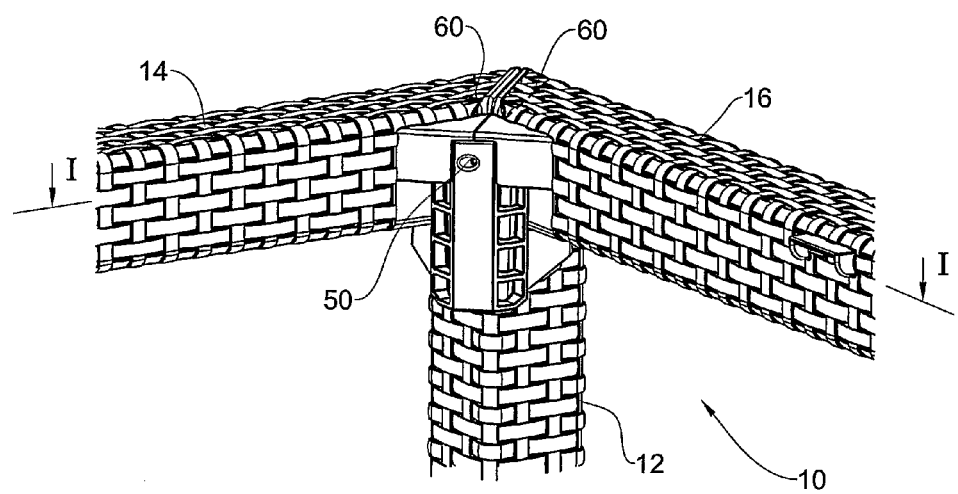
FIG. 2A is a perspective view of the assembled corner coupling of FIG. 1, illustrated from the inside.
Figure 2B:
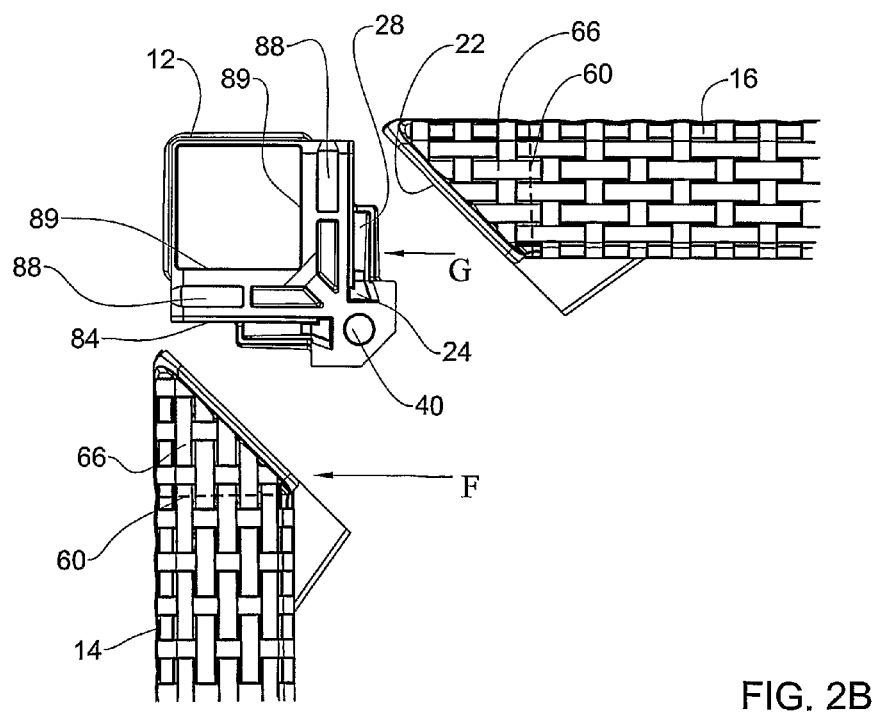
FIG. 2B is an exploded top view of the corner coupling of FIG. 2A.
Figure 2C:
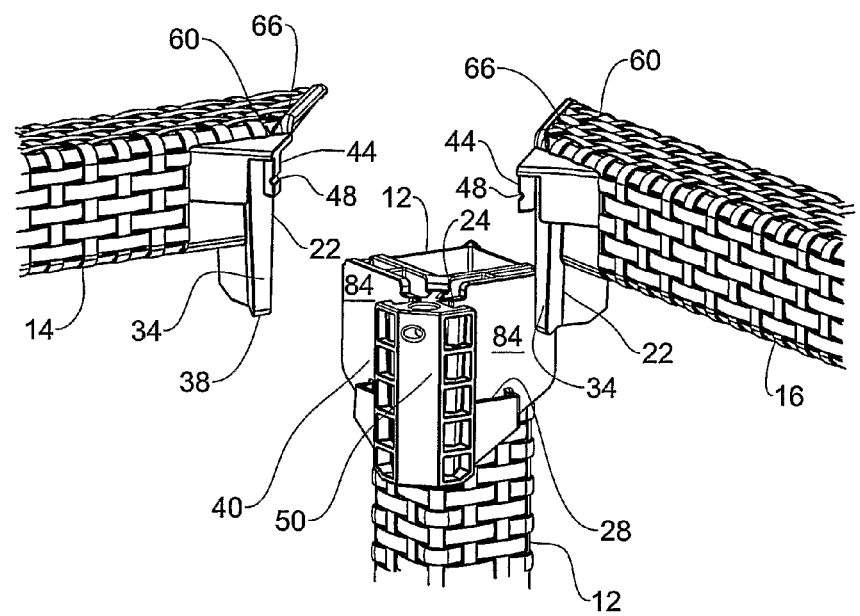
FIG. 2C is a perspective exploded view of the coupling of FIG. 2A.
Figure 2D:
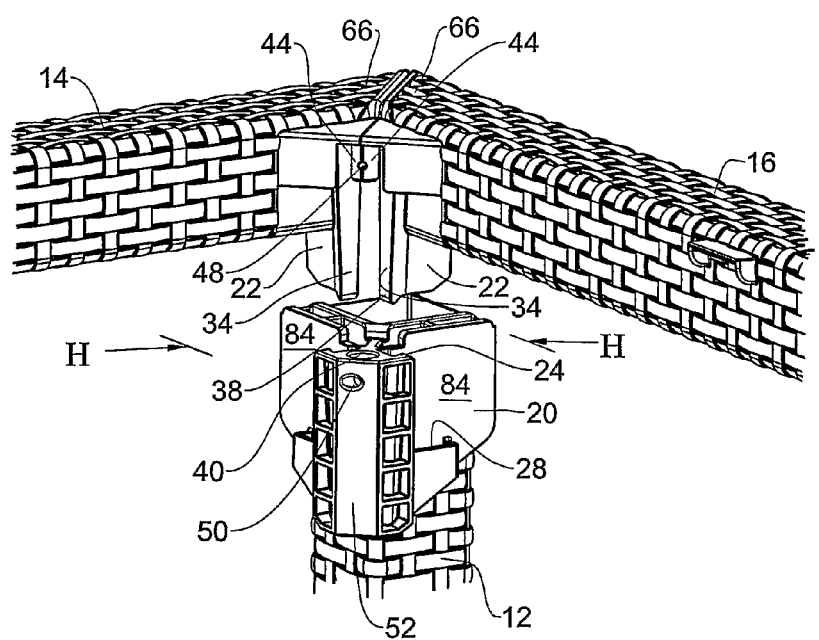
FIG. 2D is a perspective view illustrating a first step in assembly of the corner coupling of FIG. 2A.
Figure 2E:
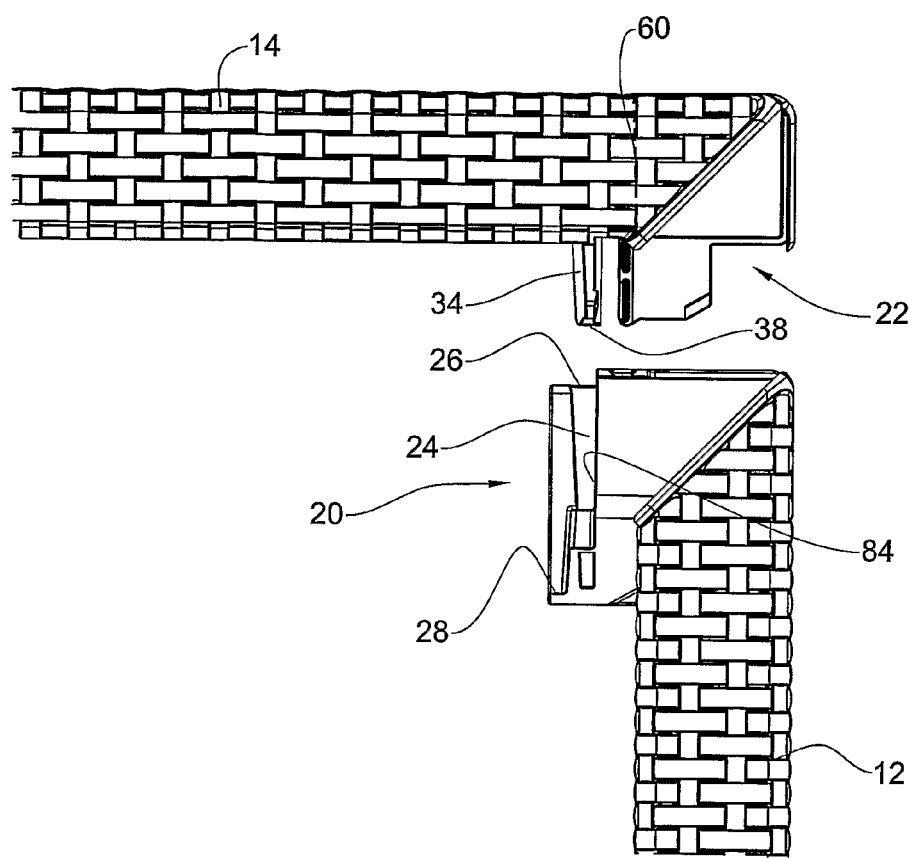
FIG. 2E is a side, exploded view of the corner coupling of FIG. 2A.
Figure 2F:
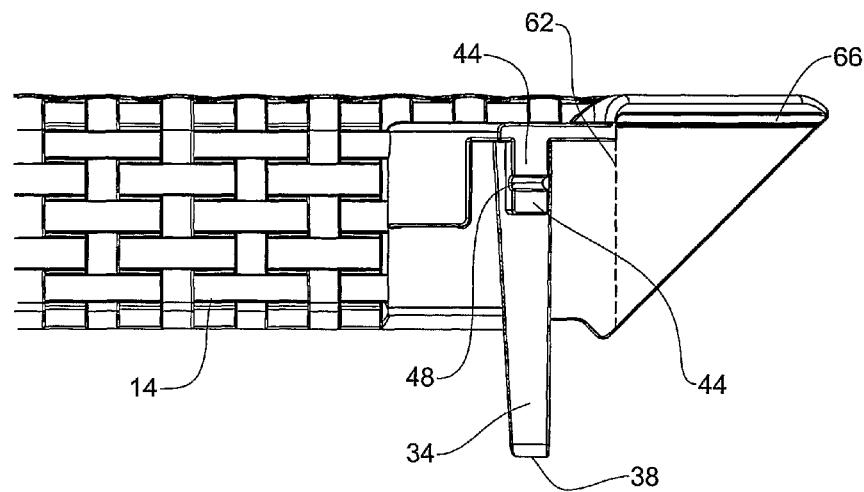
FIG. 2F is a side view along arrow F in FIG. 2B.
Figure 2G:
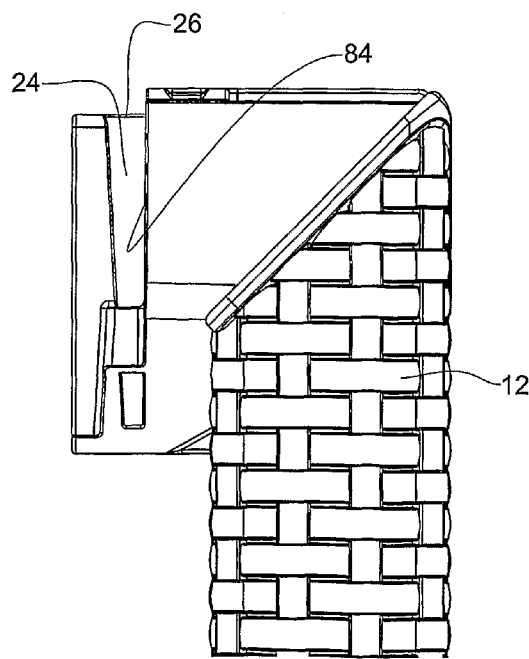
FIG. 2G is a side view along arrow G in FIG. 2B.
Figure 2H:
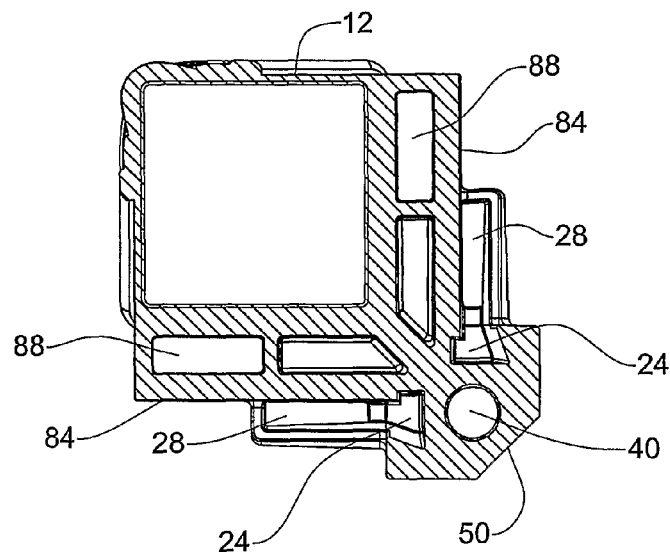
FIG. 2H is a horizontal section taken along line H-H in FIG. 2D.
Figure 2I:
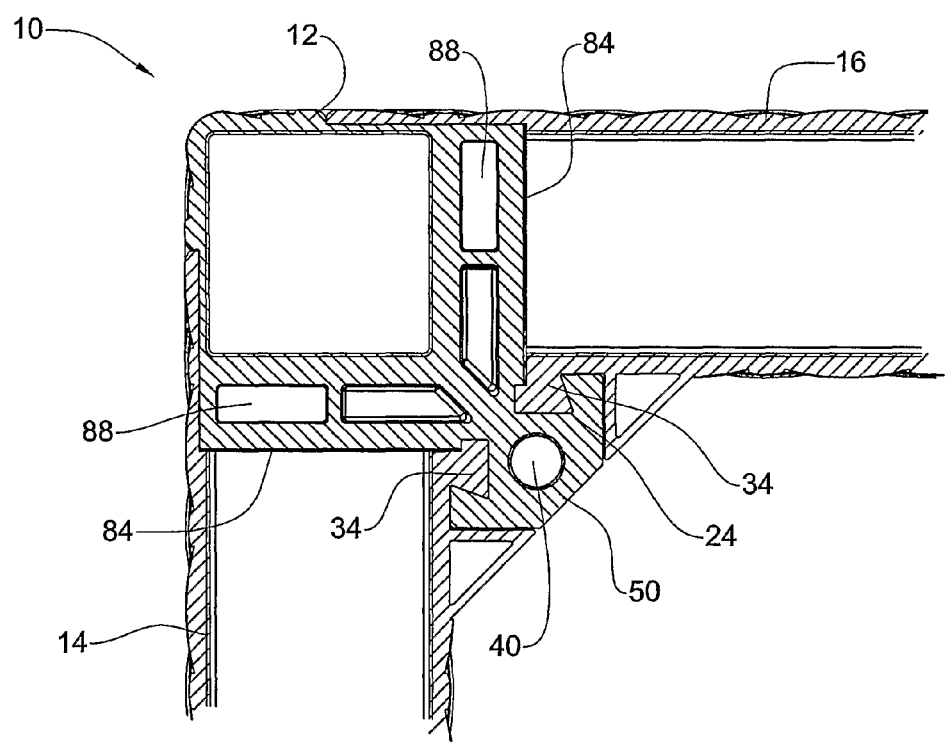
FIG. 2I is a section view along line I-I in FIG. 2A.

As can further be seen (for example in FIG. 2B) the support post is fitted with an inwardly spacing auxiliary locking receptacle in the form of a bore 40 where each of the beams 14 and 16 is fitted with a locking tab 44, the arrangement being such that the locking tabs 44 are in the shape of a sectioned cylinder which upon assembly are suited for insertion into the auxiliary locking receptacle 40 (FIG. 2D). Furthermore, the two half cylinders 44 and are fitted with a substantially vertically extending locking slot 48 which at the assembled position give rise to forming of a hollow cylinder corresponding with a pin receptacle 50 formed in an inner side wall 52 of the CCU 20, such that upon insertion auxiliary locking tab 44 into the auxiliary locking receptacle 40, a locking pin or screw (not shown) is introduced through slot 50 for engagement within the slot 48 to prevent unintentional detachment of the beams 14 and 16 from the support post 12.

It is further noticed that whilst each of the beams 14 and 16 terminates at a right end (designated by dashed lines 60 and 62 (the straight edges may be clearly be seen in FIG. 2I)) however each beam is fitted with a triangular concealment portion designated 66 which mates with the corresponding portion of the other beams so as to complete and cover the top, open end of support beam 12 as can be seen for example in FIG. 2A.

It can be seen, for example in FIG. 2C, that the CCU has a substantially flat surface designated 84, which at the assembled position bears flush against the corresponding straight edges of each of the support beams.

Also noted in the draws, the CCU is formed with a spacing 88 extending between a wall portion 89 of the support post 12 and the surface wall 84 of the CCU. Thus, spacing 88 may be used as an auxiliary locking receptacle for arresting therein a downwardly extending locking tab (not shown) extending downwardly at a bottom surface of the concealment triangular portion 66 of the BEC.

The CCU may be integrally formed at the end of support post 12 or may be separately manufactured and articulated thereto e.g. by a fastener, bolts and the like. Alternatively, it may be moulded over the respective end of the support post 12. The same arrangement applies also regarding the BEC and the respective beam.

It is further appreciated that a support post in accordance with the disclosed subject matter may comprise one or more central coupling units (CCUs), each formed on respective faces of the support post. According, for example, a triangular support post may comprise up to three CCUs, and a rectangle sectioned support post may comprise up to four such CCUs. However, it is appreciated that even a circular sectioned support post may be fitted with one or more CCUs, by an intermediate portion between the circular section of the post and the CCU.

Whilst the examples disclosed herein in connection with the disclosed subject matter illustrates a substantially Cartesian system, it is appreciated that by forming one or both of the CCU and respective BEC at an inclination with respect to longitudinal axis of the respective support post or beam, the assembled corner may assume other than right angle Cartesian configuration.

Even more so, the arrangement is such that the coupling is modular namely a beam fitted at its respective end with a BEC may be coupled to a support post at any of its corresponding CCUs (with the exception in case of providing concealment covers).

Figure 3A:
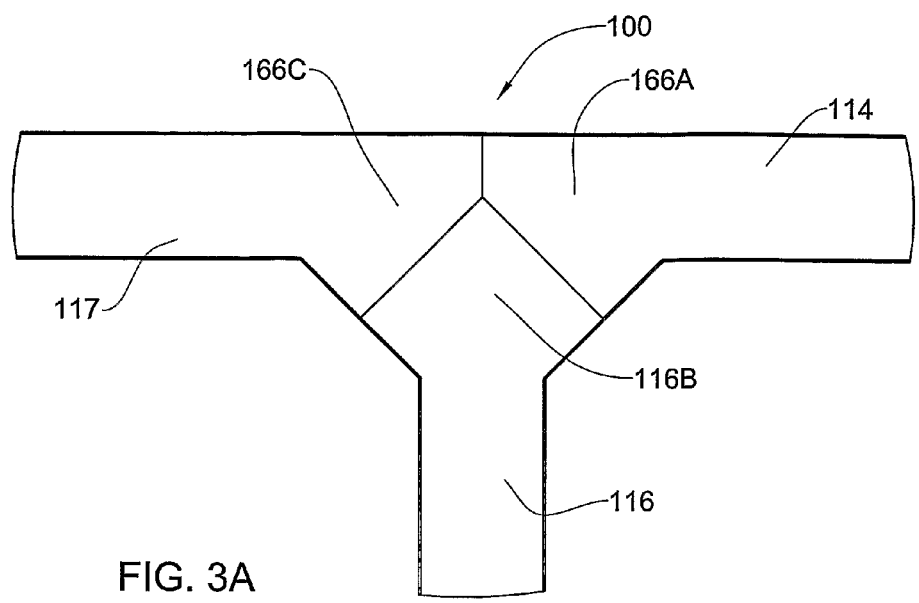
FIG. 3A is a top, planar view of a corner coupling in accordance with another example of the disclosed subject matter.
Figure 3B:
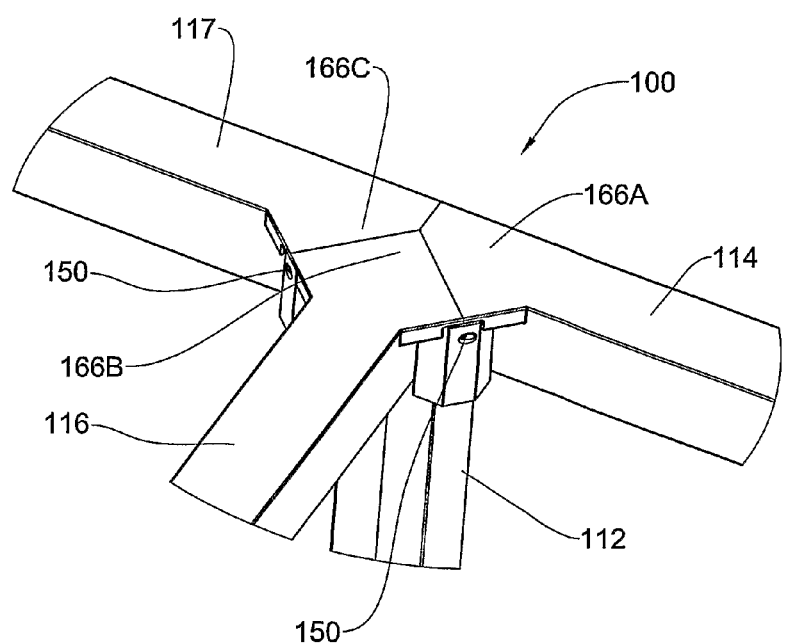
FIGS. 3B and 3C are isometric views of the corner coupling of FIG. 3A.
Figure 3C:
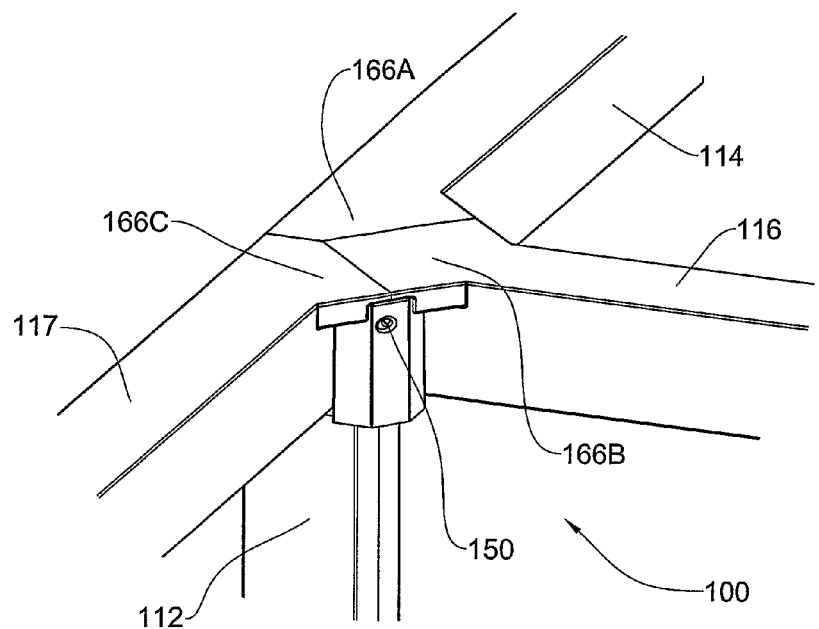
Figure 4A:
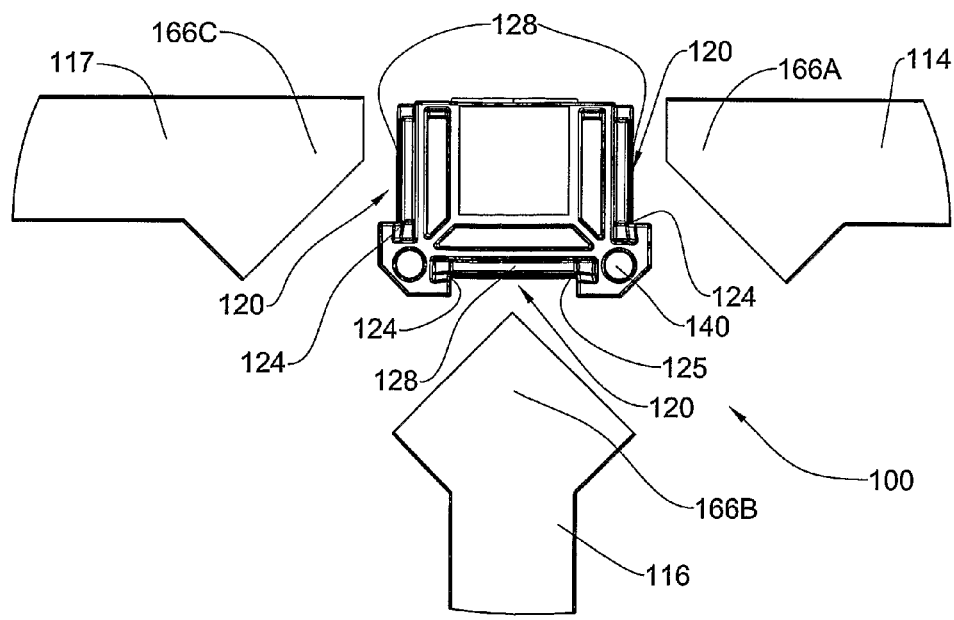
FIG. 4A is a top, planar exploded view of the corner coupling illustrated in FIGS. 3A to 3C.
Figure 4B:
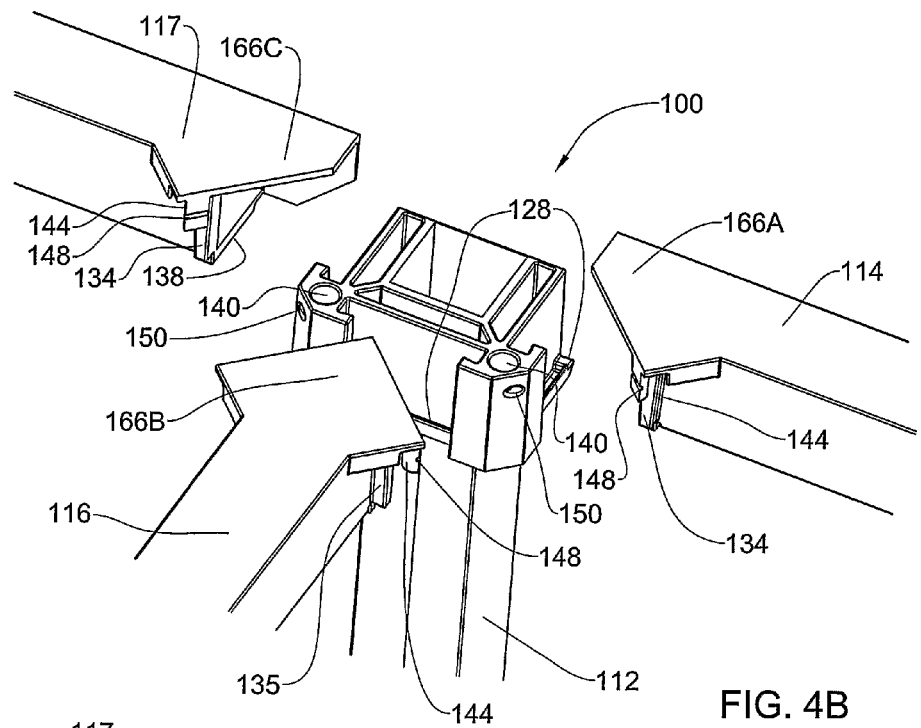
FIGS. 4B to 4E are perspective views illustrating consecutive steps of assembly of the corner coupling illustrating in FIGS. 3A to 3C.
Figure 4C:
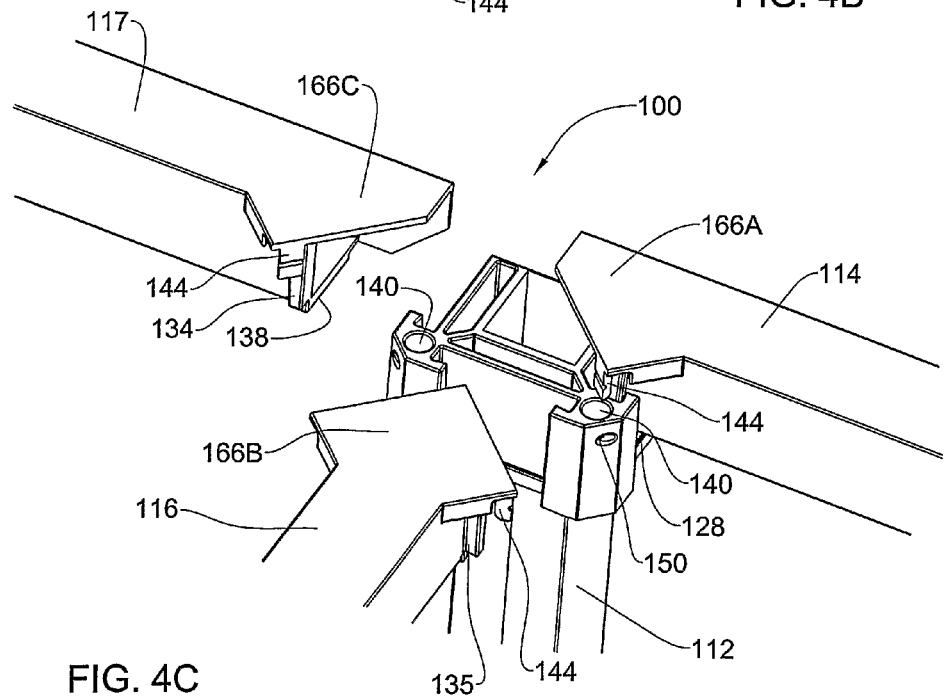
Figure 4D:
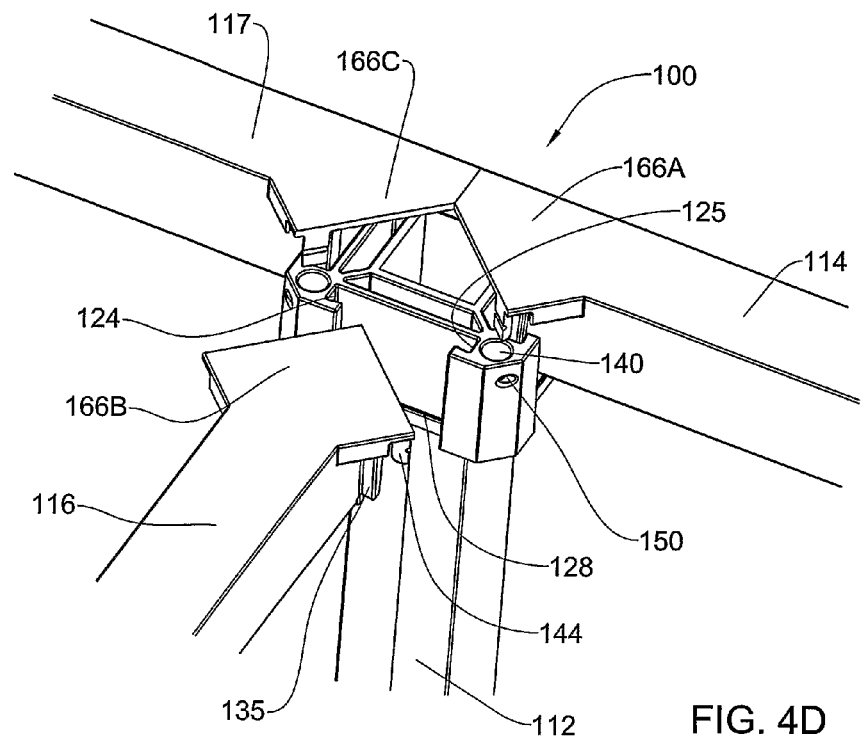
Figure 4E:
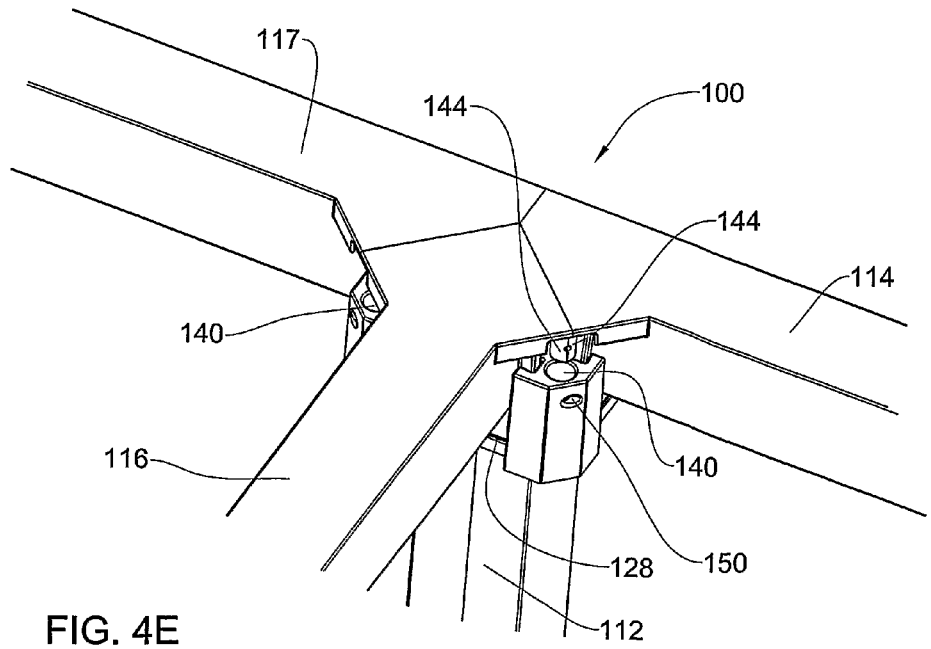

In FIGS. 3A to 3C there is illustrated yet another example of the corner coupling in accordance with the subject matter, generally designated 100, in which like elements have been assigned with like reference numbers as in the previous example, however shifted by 100.

The example of FIGS. 3A to 3C is illustrated in various consecutive assembly positions in FIGS. 4A to 4E.

The support post in the present example generally designated 112 is formed at three of its faces namely, front face, right face and left face with a central coupling unit CCU designated 120 configured for coupling corresponding beam end couplers BECs of respective beams 114, 116, and 117. Each of the central coupling units 120 are substantially similar to that disclosed in connection with the previous examples and comprises a substantially vertically extending, downwardly tapering support slot 124 extending from a top end of the support post 112, and further comprising an arresting rail 128 extending the lower end of the CCU, and standing substantially horizontally. As for the front CCU, it comprises in this particular example a second tapering support slot designated 125 configured similar to support slot 124 however oriented in opposite direction.

Each of the beam end couplers BECs fitted at a respective end at each of the beams 114, 116 and 117 is configured a tapering locking tab 134 extending substantially vertically and adapted for wedge-engagement within the corresponding tapering arresting rails 124, and further comprising a substantially horizontally extending support tab 138 (FIGS. 4B and 4C) adapted for arrestment within the support slot 128 of the corresponding CCUs.

It is noticed that the front BEC is fitted with an additional tapering locking tab 135 for wedge-engagement within a corresponding tapering arresting rail 125 of the front-facing CCU.

Furthermore, and similar to the configuration of the previous example, each of the beams is fitted with a hemi-cylindrical auxiliary tab designated 144 which together with a neighbouring locking tab, when inserted into the cylindrical receptacle 140, constitute a locking arrangement, arrested by a pin (not shown) inserted through slot 150, engageable with a recess 148 composed by the two neighbouring hemi-cylindrical tabs 134.

As seen in the drawings, the top of the support post 112 is open and unpleasing to the eye, thus, each of the beams 114, 116 and 117 is fitted with a cover portion 166A, 166B, and 166C, which together give rise to concealment of the opening of the support post, in an eye-pleasing manner.

It is also appreciated that the support post 112 illustrated in FIGS. 3 and 4 may support between one to three beams, in light of the fact that its top end is fitted with only three CCUs. However, in accordance with another example, as exemplified in FIGS. 5 and 6, a support post is configured to support four beams extending at right angles, as discussed hereinafter.

Figure 5A:
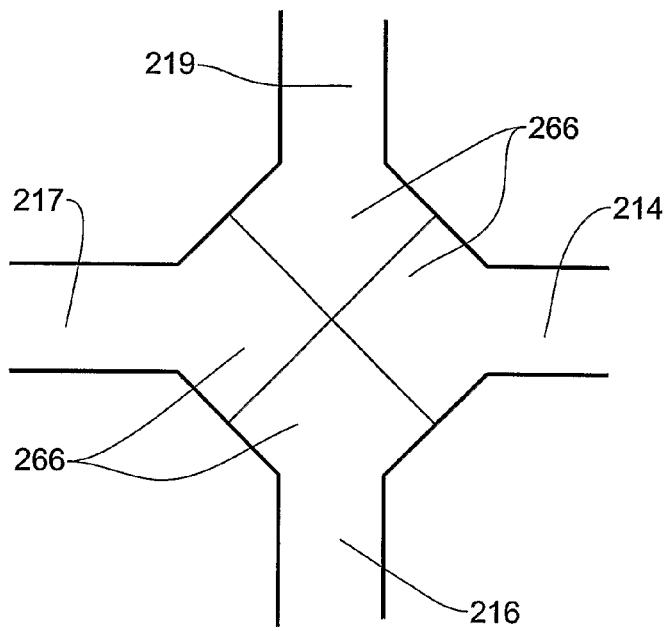
FIGS. 5A and 5B are a top planar view and isometric view respectively, of an assembled corner coupling in accordance with yet another example of the disclosed subject matter.
Figure 5B:
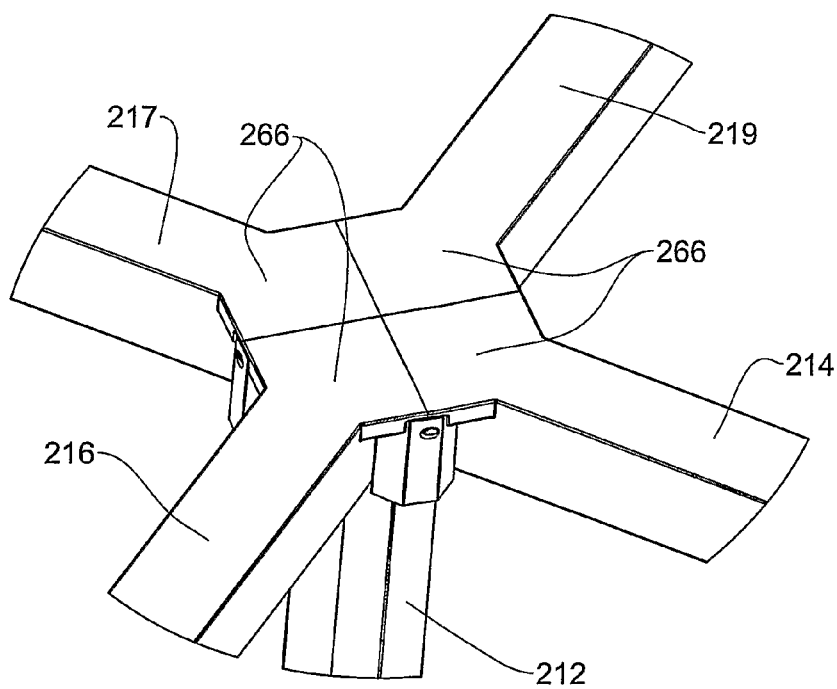
Figure 6A:
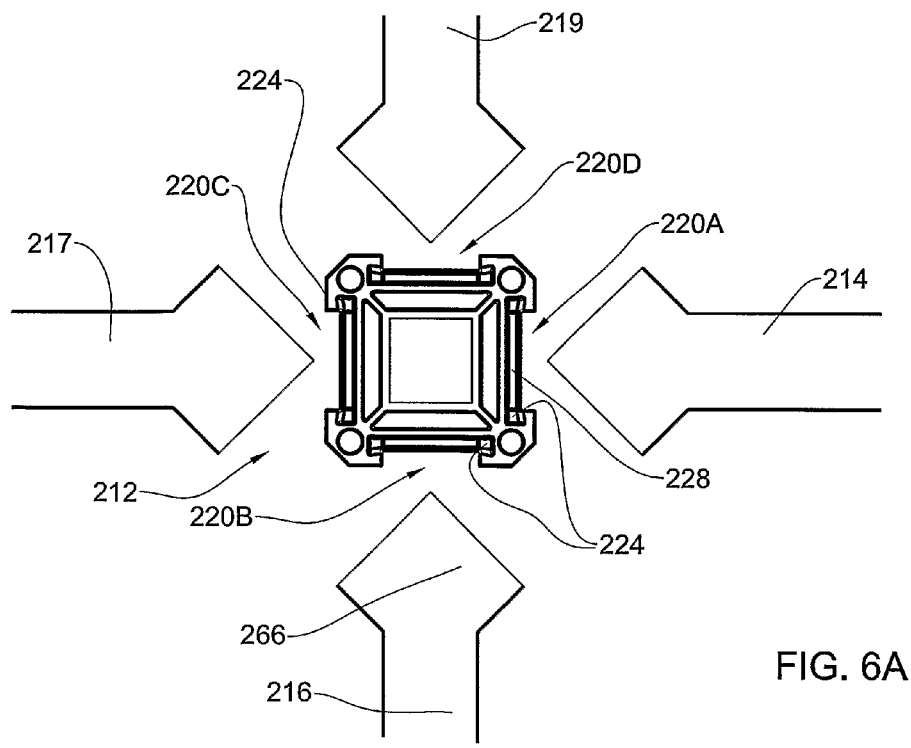
FIG. 6A is a top, planar view in an exploded state of the coupling system of FIGS. 5.
Figure 6B:
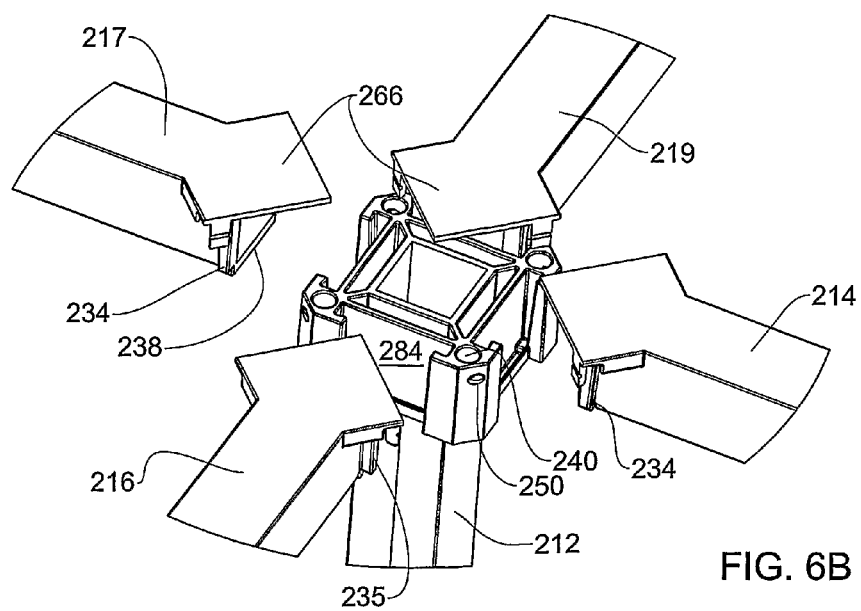
FIGS. 6B to 6F are top isometric views illustrating consecutive steps of assembling the corner coupling of FIGS. 5.
Figure 6C:
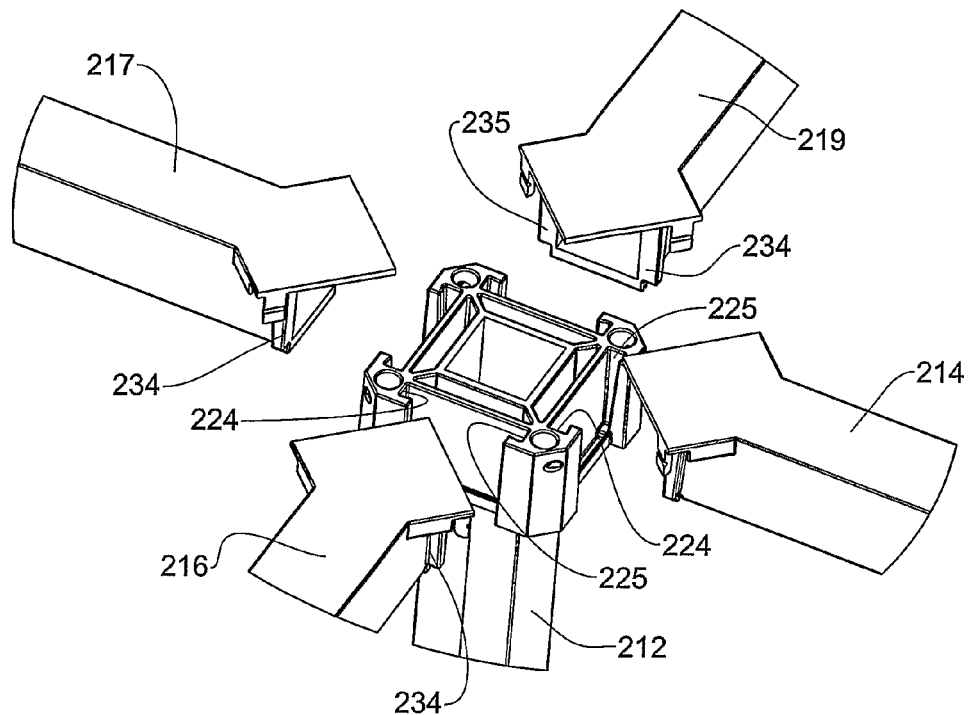
Figure 6D:
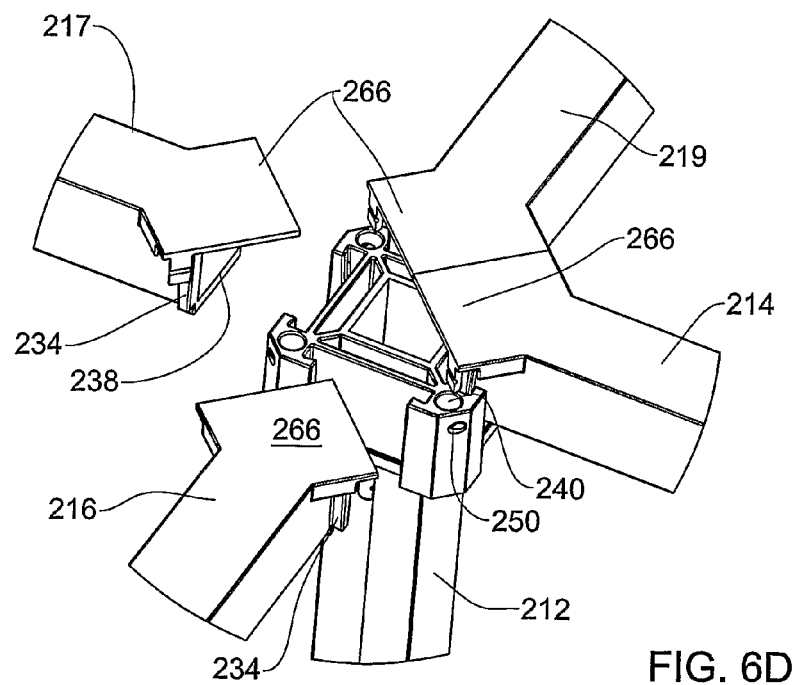
Figure 6E:
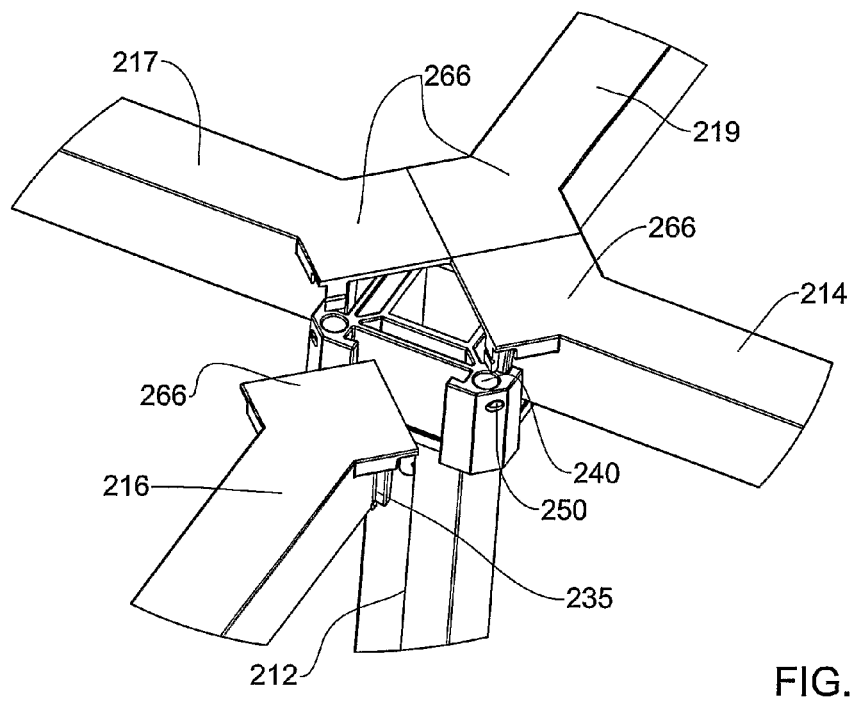
Figure 6F:
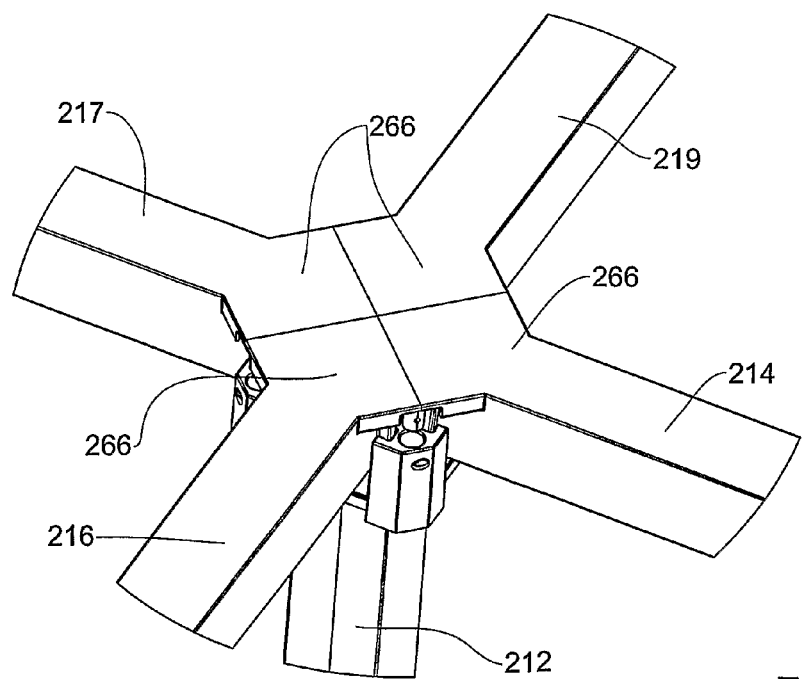
Figure 7A:
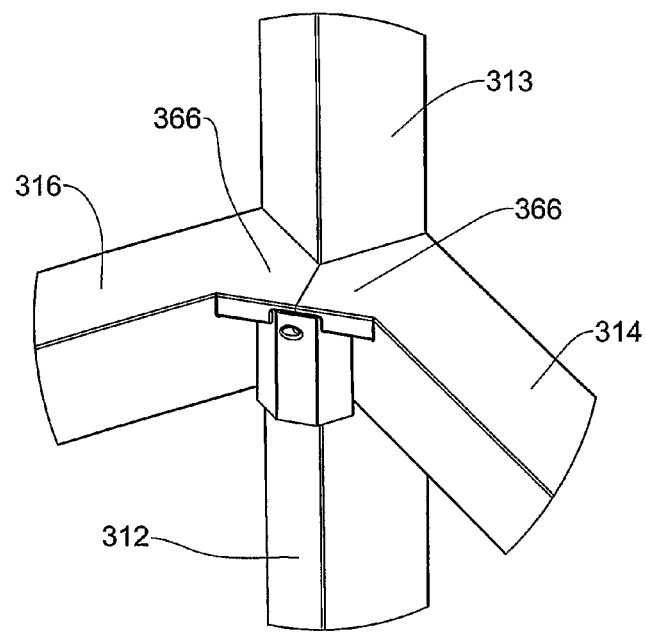
FIGS. 7A to 7D are perspective views illustrating a corner coupling in accordance with the disclosed subject matter, wherein side beams are coupled at a mid portion of the support post.
Figure 7B:
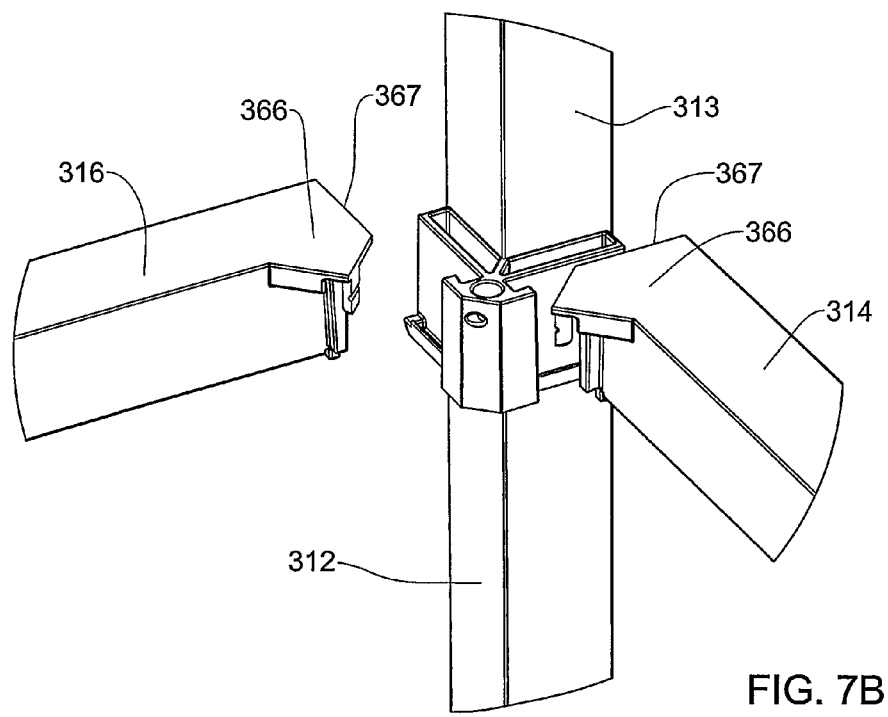
Figure 7C:
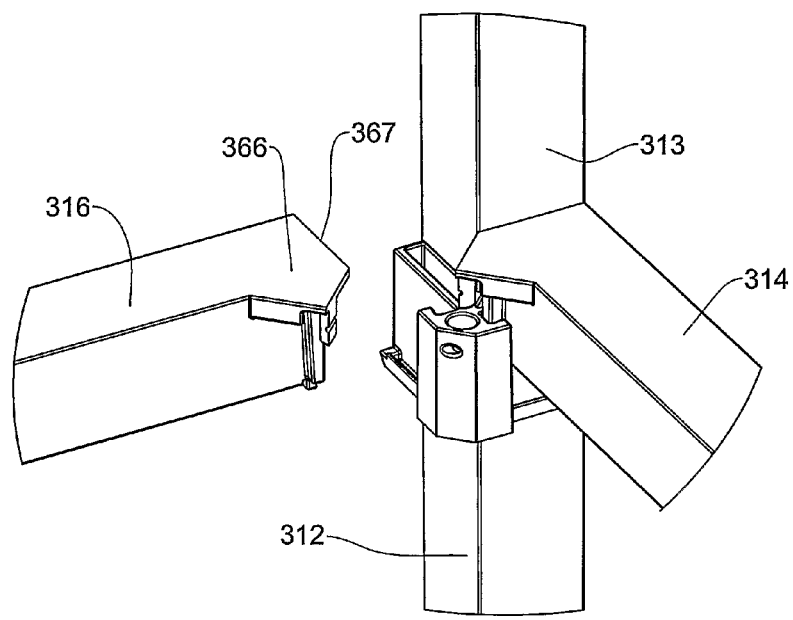
Figure 7D:
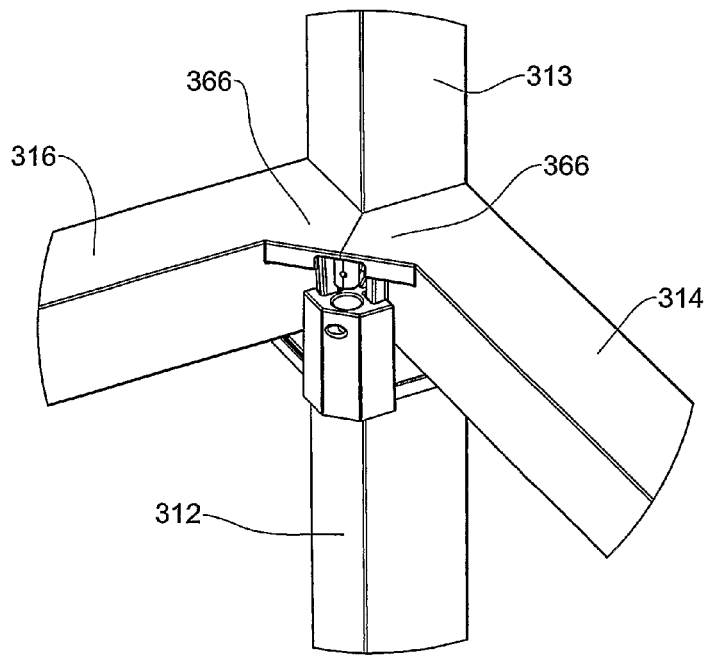
Figure 8A:
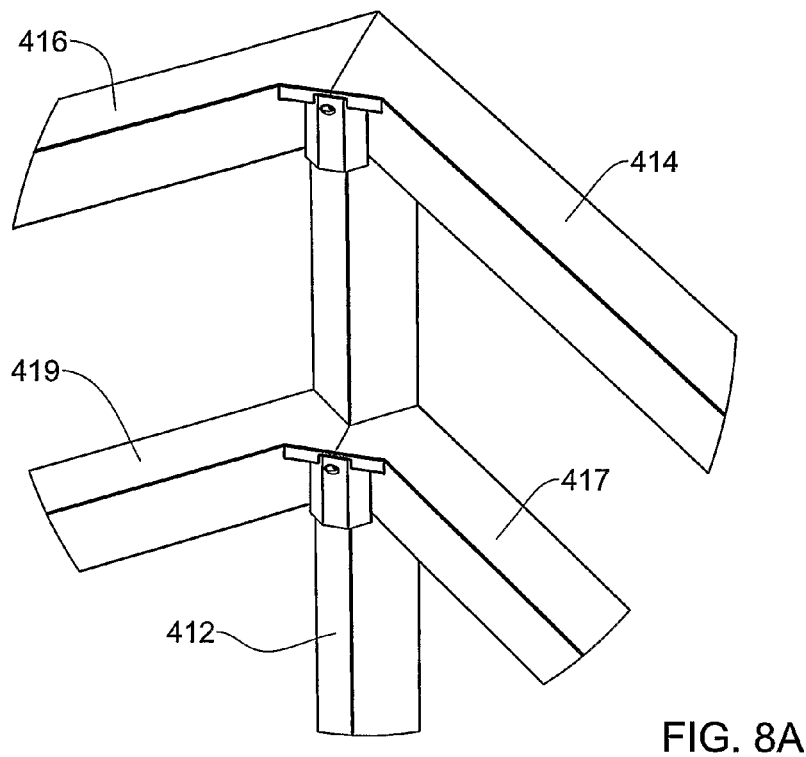
FIGS. 8A to 8D are a modification illustrating a corner coupling in accordance with the disclosed subject matter wherein the support beam has a pair of beams at a mid portion thereof and at a top end thereof.
Figure 8B:
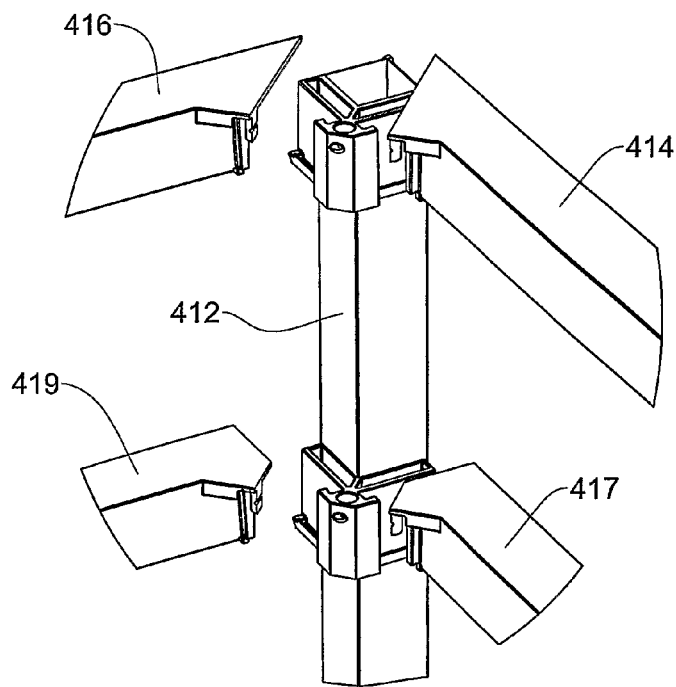
Figure 8C:
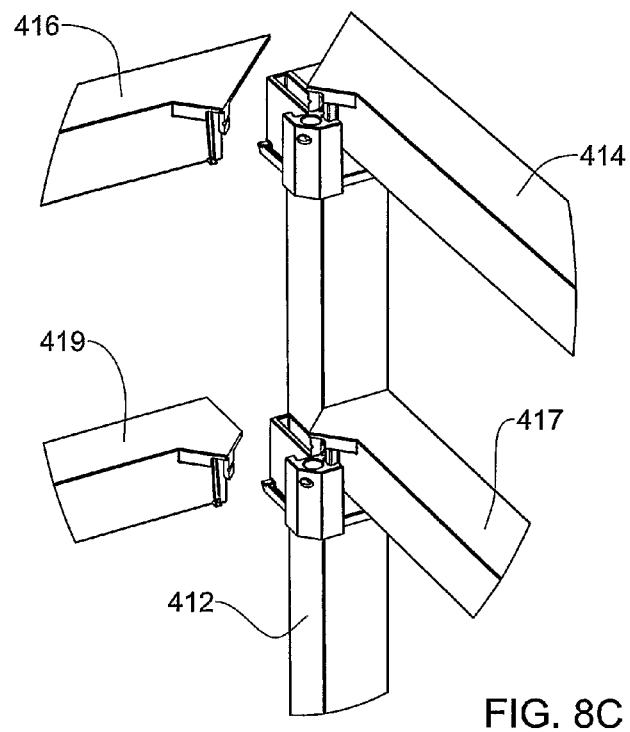
Figure 8D:
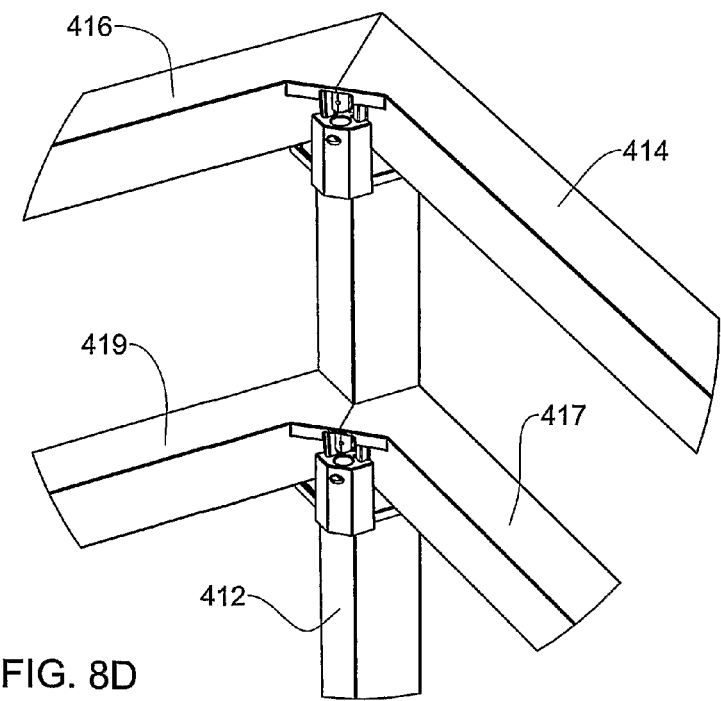
Figure 9A:
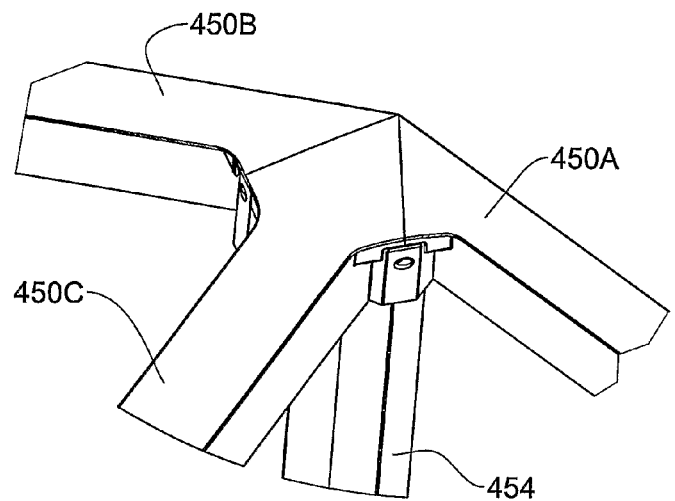
Figure 9B:
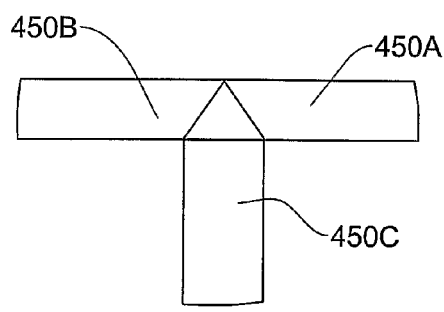
Figure 9C:
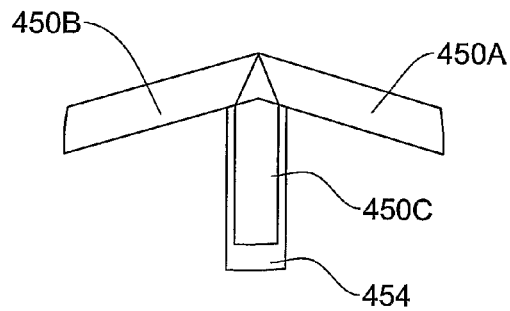
Figure 9D:
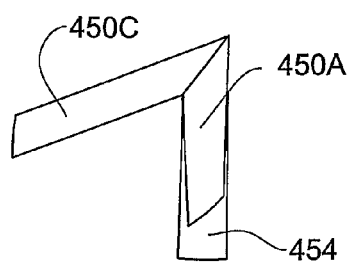

FIGS. 5 and 6 are directed to a further example of the disclosed subject matter, illustrating a corner coupling generally designated 200, wherein like elements are designated with like reference numbers as in FIGS. 1 and 2, however shifted by 200.

In the example of FIGS. 5 and 6, the support beam 212 supports four beams 214, 216, 217 and 219, extending at right angles with respect to one another and substantially horizontally about the vertically extending support post 212.

As far as coupling connection between the support post and the respective beams, coupling is facilitating by the same arrangement as disclosed hereinsofar, namely the top end of support post 212 is fitted with four central coupling units (CCUs) 220 (namely 220A, 220B, 220C and 220D, respectively) each configured with a tapering arresting rail 224 extending substantially parallel to the support post 212, and a support slot 228 extending below a top edge of the arresting rail 224 and extending substantially perpendicular thereto. Each of the beams 214, 216, 217 and 219 is fitted at its respective end with a beam end coupler BEC respectively fitted with a tapering locking tab 234 for wedging arresting by the respective arresting rail 224, and further comprising a support tab 238 (best seen in FIGS. 6B, 6C and 6D) for arresting within a respective support slot 228.

Noting the symmetric construction, each CCU is fitted with a pair of tapering arresting rails namely 224 and 225 and likewise, each beam end coupler BEC is fitted with a corresponding pair of tapering locking tabs 234 and 235.

In the example of FIGS. 5 and 6 each BCE is fitted with a sectioned cylindric portion 244 fitted for engagement within the tubular receptacle 240 for arresting therein by means of an arresting pin (not shown) provided through slot 250.

Furthermore, each of the BCEs is fitted with an arrowhead-like concealing cover formed at a top surface thereof, designated 266 which together with neighbouring such couplers complements into a complete cover concealing a top opening of the support post 212.

In the previously disclosed embodiments, the configuration was such that the horizontally extending beams were articulated at a top end of the support post. As illustrated in the example of FIGS. 7A to 7D, beams designated 314 and 316 are illustrated in configuration for coupling at a mid section of a support post 312. It is appreciated that the coupling arrangement is substantially similar to that disclosed hereinafter with the exception that the top cover segments 366 extending from the top surface of each of the beams 314 and 316 are shaped so as to extend flush against the upper section 313 of the support post 312 i.e. an edge 367 of the covers 366 extends flush against side walls of the upper section 313 of the support post. Apart for this difference, the engagement of the beams 314 and 316 is facilitated in the same manner as disclosed hereinbefore in connection with the examples illustrated in the preceding figures.

FIGS. 8A to 8D disclosed still an example of the disclosed subject matter which in fact is a combination of the examples illustrated in connection with FIG. 7 and FIG. 2, namely support post 412 is fitted with a top pair of beams 414 and 416, and a lower pair of beams 417 and 419, said beams being coupled in the same manner as disclosed hereinbefore wherein beams 414 and 416 correspond with beams 14 and 16 of FIG. 2 and beams 417 and 419 correspond with the arrangement disclosed in connection with FIG. 7.

Those skilled in the art to which this invention pertains will readily appreciate that numerous changes, variations, and modifications can be made without departing from the scope of the invention, Mutatis Mutandis. For example, as illustrated in FIGS. 9A to 9D, there is illustrated a corner coupler according to a modification of the disclosure, wherein the beams 450A, 450B and 450C extend inclined with respect to one another and with respect to the support post 454.

The invention claimed is:

1. A corner coupling for attaching one or more beams to a support post, the coupling comprises:
   one or more central coupling units attached to or integral with the support post; and
   one or more beam end couplers each located at an end of the one or more beams and configured for being detachably attachable to a respective central coupling unit;
   wherein each beam end coupler is configured for arresting engagement with an arresting arrangement of a respective central coupling unit, wherein the arresting engagement comprises at least a wedge-type engagement provided by each of the one or more central coupling units being formed with;
      at least one outer wall surface positioned at an outer periphery of the support post,
      a tapering arresting rail formed along a longitudinally extending side edge of the outer wall surface and extending substantially parallel to the support post along the outer wall surface such that a first space is formed between the outer wall surface and the tapering arresting rail, and
      a support slot, the support slot defined by an enclosure extending outwardly from a lower end of the outer wall surface with an opening at an upper end of the enclosure, wherein the enclosure defines a second space substantially parallel to the outer wall surface, and aligned adjacent with the first space, and
   wherein each of the one or more beam end couplers is fitted with:
      a corresponding tapering locking tab configured for wedging arresting with the tapering arresting rail in the first space, and
      a support tab formed adjacent a lower end of the tapering locking tab, the support tab extending from and along a longitudinal edge of the tapered locking tab, and configured for insertion within the second space of the support slot.

2. A corner coupling according to claim 1, wherein the one or more beams are coupled to the support post at substantially right angles.

3. A corner coupling according to claim 1, wherein further support and arresting is provided by one or more auxiliary locking receptacles formed in the one or more central coupling units and corresponding one or more auxiliary projecting tabs formed in the one or more beam end couplers for arrestment within said one or more locking receptacles.

4. A corner coupling according to claim 1, wherein further support and arresting is provided by one or more locks provided for securing the assembled structure and to prevent its unintended disassembly.

5. A corner coupling according to claim 1, wherein the one or more central coupling units is fitted at a top end of the support beam, and the one or more beam end couplers further comprises a cover segment for concealment of the top of the support beam.

6. A corner coupling according to claim 5, wherein the one or more beam end couplers is fitted with an auxiliary locking tab projecting into an auxiliary locking receptacle formed at the center of the support rod.

7. A corner coupling according to claim 5, wherein where several beams are coupled to the support post thus each beam end coupler is fitted with a complimentary portion of a post cover, together covering the top end of the support beam.

8. A corner coupling according to claim 1, wherein the one or more beam end couplers is secured to the one or more central coupling units by another locking tab projecting into a respective locking receptacle of the one or more beam end couplers and fixed by a lateral fastener engaging the locking tab within the locking aperture.

9. A corner coupling according to claim 8, wherein two neighbouring beams are locked to the support post by a common locking receptacle with two respective locking tabs of the neighbouring one or more beam end couplers complimenting one another to complete the shape of the locking receptacle, with a locking pin laterally fixing and arresting the beam end couplers of the two neighbouring beams.

10. A corner coupling according to claim 1, wherein the one or more central coupling units is fitted at any location along the support post.

11. A corner coupling according to claim 1, wherein the one or more central coupling units (CCU) is provided at one or more faces of the support post.

12. A corner coupling according to claim 1, wherein the one or more central coupling units are equi-angularly distributed about the support post, or at irregular angles.

13. A corner coupling according to claim 1, wherein the one or more central coupling units and one or more beam end couplers are integrally manufactured with the support post and beam, or over-moulded over a section of the support post and respectively at an end of a beam, or supplied separately such that it can be fitted over the respective parts being attached.

* * * * *